(12) United States Patent
Van

(10) Patent No.: US 6,658,476 B1
(45) Date of Patent: Dec. 2, 2003

(54) CLIENT-SERVER PROTOCOL SUPPORT LIST FOR STANDARD REQUEST-RESPONSE PROTOCOLS

(75) Inventor: Van C. Van, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/450,258

(22) Filed: Nov. 29, 1999

(51) Int. Cl.[7] .............................................. G06F 15/16
(52) U.S. Cl. ........................ 709/230; 709/223; 709/226
(58) Field of Search ......................... 707/102; 709/232, 709/203, 231, 219, 223, 226, 230

(56) References Cited

U.S. PATENT DOCUMENTS

| | | | | | |
|---|---|---|---|---|---|
| 5,848,234 | A | * | 12/1998 | Chernick et al. | 709/203 |
| 5,999,979 | A | * | 12/1999 | Vellanki et al. | 709/232 |
| 6,128,653 | A | * | 10/2000 | del Val et al. | 709/219 |
| 6,208,952 | B1 | * | 3/2001 | Goertzel et al. | 702/203 |
| 6,266,701 | B1 | * | 7/2001 | Sridhar et al. | 709/232 |
| 6,401,097 | B1 | * | 6/2002 | McCotter et al. | 707/102 |
| 6,415,327 | B1 | * | 7/2002 | Beckerman et al. | 709/231 |

OTHER PUBLICATIONS

Josh Cohen, Jul. 22, 1997, OPTIONS Spec, Google Search, pp. 1–6.*

Li et al, Jun. 1999, "HPF : A Transport Protocol For Supporting Heterogeneous Packet Flows in the Internet", IEEE, pp. 543550.*

T. Bray, J. Paoli, C.M. Sperberg–McQuen, eds., Extensible Markup Language (XML) 1.0, W3C Recommendation Feb. 10, 1998, REC–xml–19980210, Feb. 10, 1998.

R. Fielding et al., Hypertext Transfer Protocol—HTTP/1.1, Network Working Group, Request for Comment 2616, Jun. 1999.

E. James Whitehead, Jr., WebDAV: An Introduction, StandardView, vol. 5, No. 1, pp. 3–8, Mar. 1997.

Y. Goland, E. Whitehead, et al., HTTP Extensions for Distributed Authoring—WebDAV; Network Working Group, Request for Comments 2518, Feb. 1999.

* cited by examiner

Primary Examiner—Nabil El-Hady
Assistant Examiner—Jungwon Chang
(74) Attorney, Agent, or Firm—Workman, Nydegger

(57) ABSTRACT

A client-server protocol support list in the context of standard request-response protocols such as the HyperText Transport Protocol (HTTP) is disclosed. In one embodiment, a method includes receiving a request according to a predetermined transport protocol. In response to receiving the request, the method transmits a list of supported client-server protocols in order of server preference, in accordance with the predetermined transport protocol. In one embodiment, the request is an OPTIONS request under HTTP. In one embodiment, the list is not a complete list of the protocols supported by the server.

32 Claims, 3 Drawing Sheets

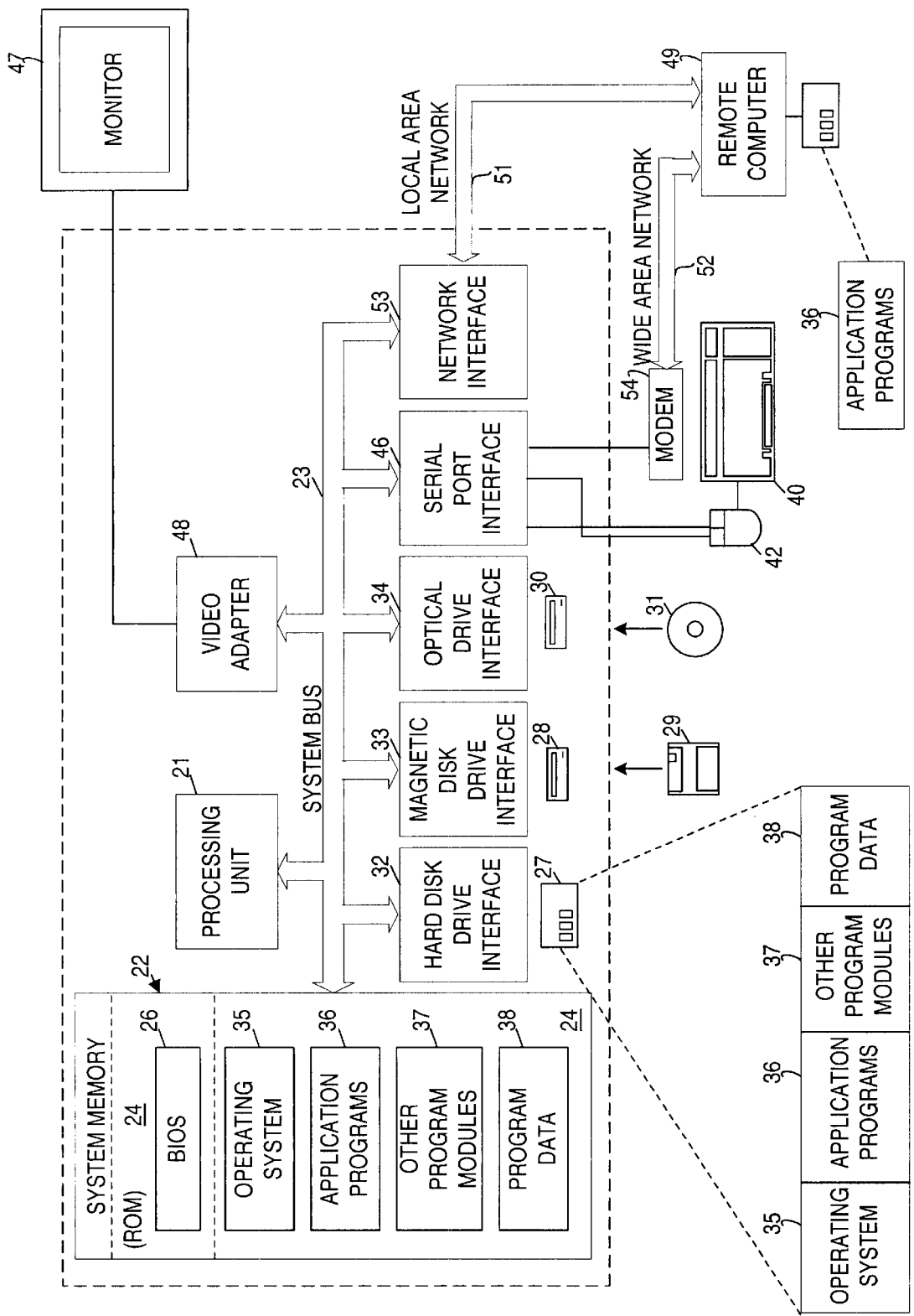

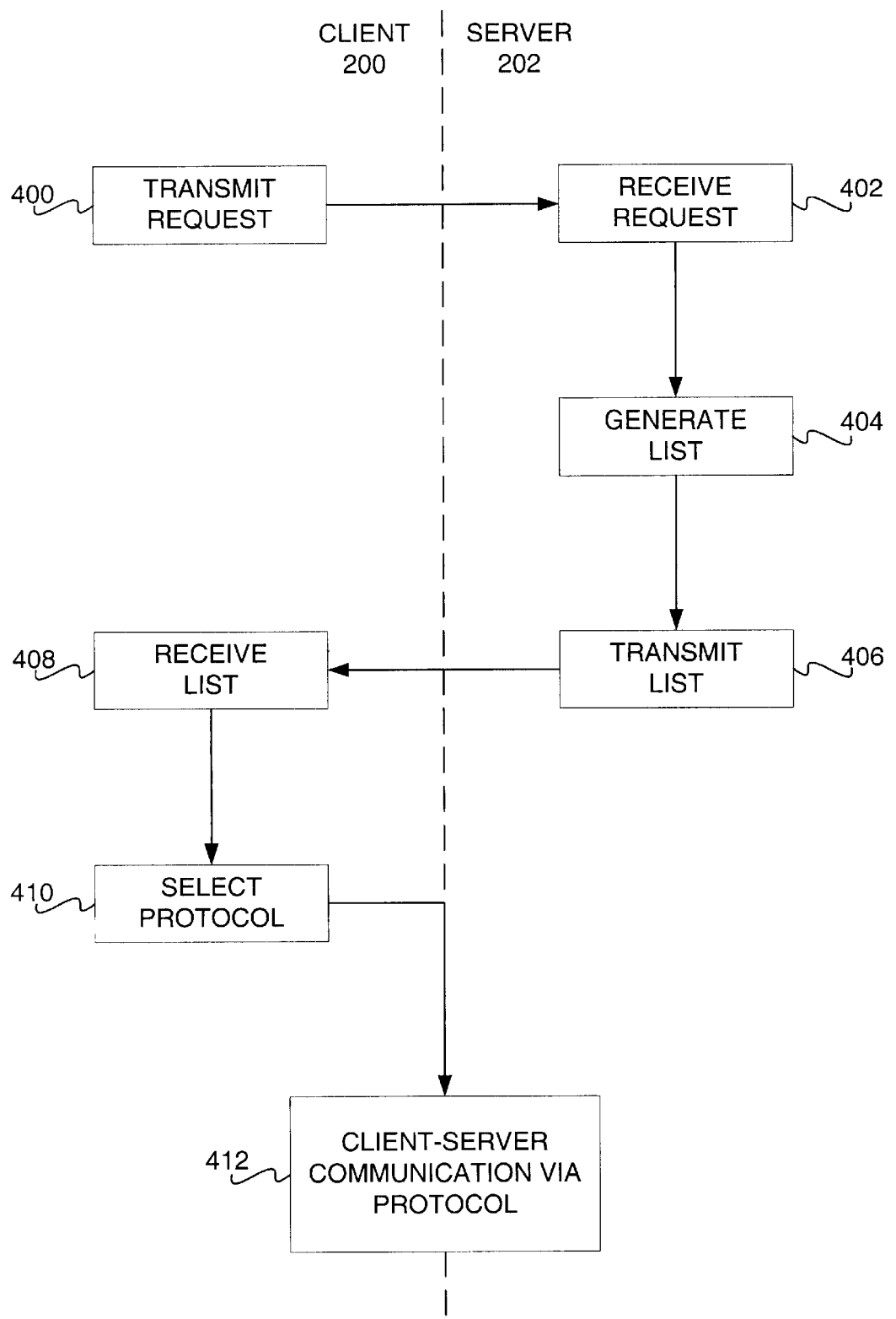

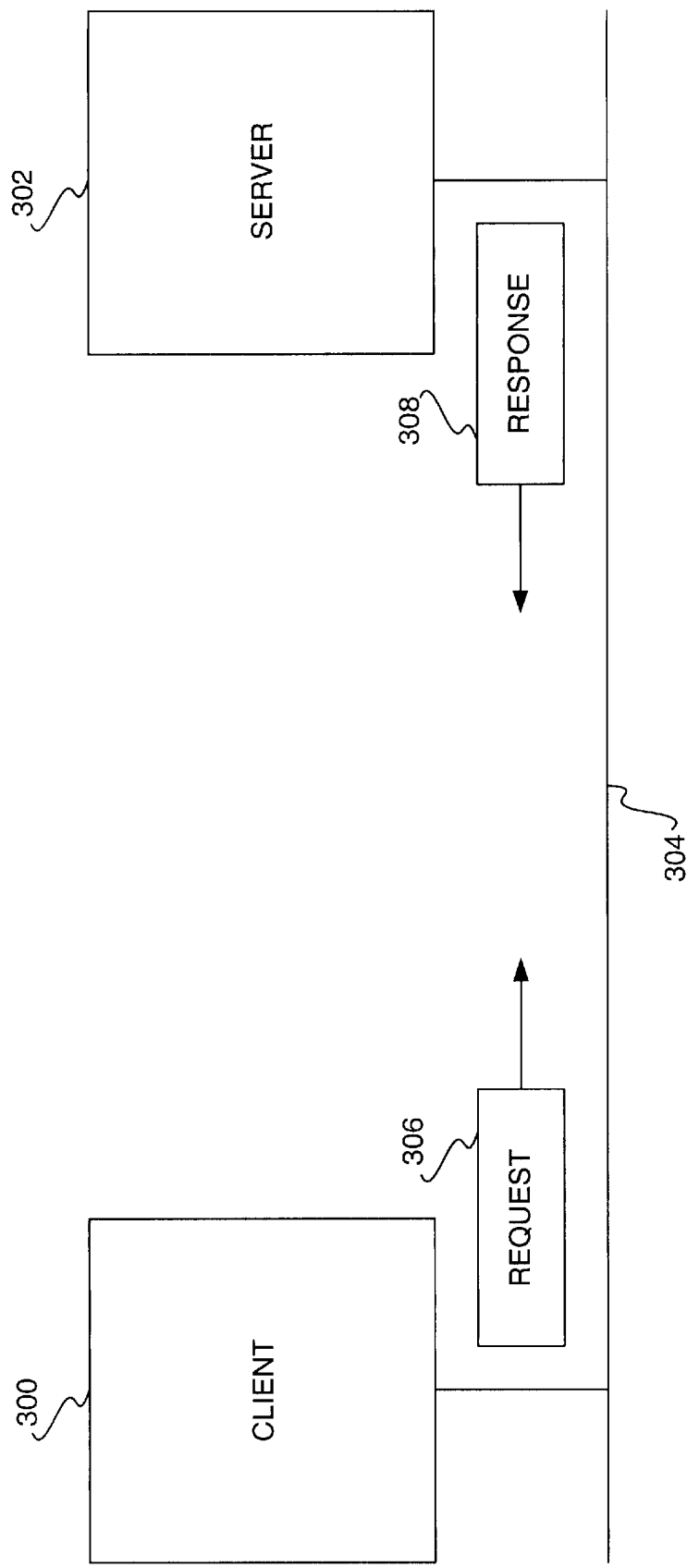

CLIENT-SERVER PROTOCOL SUPPORT LIST FOR STANDARD REQUEST-RESPONSE PROTOCOLS

FIELD OF THE INVENTION

This invention relates generally to standard request-response protocols such as the HyperText Transport Protocol (HTTP), and more specifically to providing of a client-server protocol support list for such protocols.

BACKGROUND OF THE INVENTION

The HyperText Transport Protocol (HTTP) has emerged as the standard mechanism by which information is transported over TCP/IP (Transmission Control Protocol/Internet Protocol) compatible networks, such as the Internet, intranets, and extranets. HTTP is more specifically an application-level protocol for distributed, collaborative, hypermedia information systems. It is a generic, stateless, protocol that can be used for many tasks beyond its use for hypertext, such as name servers and distributed object management systems, through extension of its request methods, error codes and headers. It is referred to as a transport protocol, since information is transported according to its specifications, and is also referred to as a request-response protocol, since information is exchanged by a client making a request of a server, which generates a response thereto. HTTP as referred to herein refers generally to any standard of HTTP, and specifically to HTTP/1.1, as described in the Request for Comment (RFC) 2616, and available on the web site http://www.w3.org.

A common use of HTTP is the transport of information formatted according to a markup language. For example, a popular application of the Internet is the browsing of world-wide-web pages thereof. In such instances, typically the information retrieved is in HyperText Markup Language (HTML) format, as transported according to HTTP. However, other standard markup languages are emerging. One such markup language is eXtensible Markup Language (XML). XML describes a class of data objects that are referred to as XML documents, and partially describes the behavior of computer programs that process them. A primary difference between HTML and XML is that within the former, information content is intertwined with the layout of the content, making their separation difficult, for example. Conversely, within XML a description of the storage layout and logical structure of content is maintained separate from the content itself. However, both XML and HTML are subsets of a markup language known as Standard Generalized Markup Language (SGML). XML as referred to herein refers generally to any standard of XML, and specifically to XML 1.0, as described in the W3C recommendation REC-xml-19980210 dated Feb. 10, 1998, and also available on the web site http://www.w3.org.

HTTP, and hence XML in the context of HTTP, allows for the access of resources. The term resource refers to any piece of information that has a location described by a Uniform Resource Locator (URL) of the form HTTP://<domain>.<domain-extension>/<sub>/<resource>.<resour.extension>, where <domain> specifies a particular domain, <sub> is a subdirectory, <resource> is a resource, <domain-extension> can be, for example, .com, .edu, and net, among others, and <resource.extension> can be, for example, .txt, .html, jpg, .gif, etc. A resource can be, for example, a Web page, a hierarchical collection of information such as folders, a document, a database, a bitmap image, or a computational object. Recently, extensions to HTTP have been proposed that, among other things, allow for better access to resources over HTTP. The extensions are generally referred to as the World-Wide-Web Distributed Authoring and Versioning (WebDAV) extensions to HTTP. The goal of WebDAV, broadly speaking, has been to add remote authoring capabilities to HTTP, so that HTTP can be more convenient as a readable and writable collaborative medium, and not necessarily only a browsing medium for web pages.

WebDAV is generally described in the reference E. James Whitehead, Jr., World-Wide-Web Distributed Authoring and Versioning (WebDAV): An Introduction, in StandardView, Vol. 5, No. 1, March 1997, pages 3–8. WEBDav is also described in the reference Internet Engineering Task Force (IETF) Request for Comment (RFC) 2518, entitled HTTP Extensions for Distributed Authoring, by Y. Goland, E. Whitehead, A. Faizi, S. Carter and D. Jensen, and dated February 1999. Generally, this latter reference specifies a set of methods, headers and content-types ancillary to HTTP/1.1 for the management of resource properties, creation and management of resource collections, name space manipulation, and resource locking (also referred to as collision avoidance).

WebDAV can be referred to as a protocol by which a client communicates information with a server in the context of HTTP. However, WebDAV is not the only such protocol. For example, client-server communication can also be performed in accordance with the protocol set forth by the Microsoft® FrontPage® (hereinafter referred to as MFP) computer program, which is a program for designing web pages and managing web sites. A server may support both WebDAV and the MFP protocols, but may prefer one or the other. Or, a server may only support either the WebDAV or MFP protocol, for instance. Both WebDAV and MFP are extensions to HTTP protocols. A limitation to such protocols, and to HTTP generally, is that there is no manner by which a client is able to determine what protocols a server supports by querying the server, and, furthermore, is not able to determine which protocol of those supported by a server that the server prefers. For these and other reasons, there is a need for the present invention.

SUMMARY OF THE INVENTION

The invention provides for a client-server protocol support list in the context of standard request-response protocols such as HTTP. In one embodiment, a method for a server includes receiving a request according to a predetermined transport protocol such as HTTP. In response to receiving the request, the method transmits a list of supported client-server protocols in order of server preference, in accordance with the predetermined transport protocol. In one embodiment, the request is an OPTIONS request under HTTP. In one embodiment, the list is not a complete list of the protocols supported by the server.

Embodiments of the invention provide for advantages not found within the prior art. For example, a client is able to query a server to determine an ordered list of protocols that the server supports in the context of a transport protocol like HTTP. The client can then use the protocol most preferred by the server that the client also supports. This ensures that the client is communicating with the server not only via a protocol support by the server, but also via a protocol that the server most prefers, insofar as that protocol is also supported by the client. Furthermore, embodiments of the invention are applicable to protocols other than HTTP protocols, such as Gopher and File Transfer Protocol (FTP).

The invention includes computer-implemented methods, machine-readable media, computerized systems, and computers of varying scopes. Other aspects, embodiments and advantages of the invention, beyond those described here, will become apparent by reading the detailed description and with reference to the drawings.

BRIEF DESCRIPTION OF THE DRAWINGS

FIG. 1 is a diagram of an operating environment in conjunction with which embodiments of the invention can be practiced;

FIG. 2 is a flowchart of a method according to an embodiment of the invention; and, FIG. 3 is a diagram of a system according to an embodiment of the invention.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or apart of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Ordered List of Supported Client-Server Protocols

In this section of the detailed description, the manner by which an list of supported client-server protocols, in order of server preference, is specified, according to varying embodiments of the invention, is described. In further sections, methods and systems according to embodiments of the invention are presented. The description is made in conjunction with the presentation of an illustrative example, according to HTTP. While the example is specific to HTTP, the invention is not so limited, and is applicable to any predetermined transport protocol.

In one embodiment, a client sends a request to a server according to HTTP to determine the protocols the server supports, and the protocols that the server prefers. Preference is defined by the server, and can be based on any criteria, such as speed, protocol richness, security, etc. In one embodiment, the request sent by the client is the OPTIONS request of HTTP, OPTIONS/dir HTTP/1.1

HOST: www.foo.bar

Content-Length: 0

As can be appreciated by those of ordinary skill within the art, the OPTIONS request is a standard request made by clients of servers. It is a server discovery mechanism within HTTP. As shown above, "dir" specifies a directory, and "1.1" is the version of HTTP. The HOST header indicates the host on which the resource or directory resides. The "0" following "Content-Length" specifies the content length, in this case, zero. Other directories, HTTP versions, resource locations, and content lengths can be specified; that which is listed above is only an illustrative example, and not meant to limit the invention.

In response to receiving this standard request, the server generates a response that includes a list of supported client-server protocols by the server, in order of server preference. The response is in accordance with HTTP as well. In one embodiment, an illustrative example response sent by the server is

HTTP/1.1 200 OK

MS-Author-Via: DAV, MS-FP/4.0

Content-Length: 0

The "1.1" following "HTTP" again specifies the version of HTTP. The "0" following "Content-Length" specifies the content length, in this case, zero. The list is specified in the line having the header "MS-Author-Via". Specifically, two protocols are listed, "DAV" and "MS-FP" (i.e., Microsoft FrontPage), specifically version 4.0 of the latter. The protocols are listed in order of server preference, such that the server prefers DAV over MS-FP.

A more general form of the list returned by the server response is that the list is of the form "<header>:<space>" followed by one or more protocols and desirably (but not necessarily) their versions, of the form "<string>/<version>". The <header> denotes the header that indicates that the list which follows is the list of server-supported protocols in order of server preference. The invention is not limited to "MS-Author-Via" as the header; for example, another header, such as "Preferred-Protocol-List", may be used. <space> indicates a space. Each protocol in the list is desirably specified by a particular string <string>, such as "DAV" or "MS-FP", etc., and a version number <version> of the version of the protocol supported by the server. The version number <version> is desirably specified in the form of "<num>.<num>", where each <num> specifies a number. In the example of the previous paragraph, however, only MS-FP has a version (4.0), and the protocol DAV does not.

While desirably the list of protocols includes all the protocols supported by the server, in order of server preference, the invention is not itself so limited. For example, the list may only be an incomplete list of supported protocols. The list may, for instance, contain only DAV, while the server itself supports DAV and MS-FP/4.0. Furthermore, it is noted that the list is particular to a particular resource as specified by the URL, and indicates the server's preference of protocols at that URL only, in one embodiment. That is, in this embodiment, it does not indicated protocol preference at other locations at the server, which are specified by other URL's. (Clients are free to assume that protocol preference in one space may be applied to another space; however, by doing so the client takes the risk of speaking a protocol that is not preferred or not supported in another space.)

Once the list of supported protocols is transmitted to the client, the client can then determine which protocol to use, understanding that it is desirably to select the most server-preferred protocol that it can, since this is likely to lead to better speed, reliability, etc., since the server supports this protocol. However, because the client may not support the highest-preference protocol that the server does, the client may default to a lower-preference protocol of the server. For example, a server may return a list of supported protocols as "DAV, MS-FP/3.0", indicating that DAV is more preferred, and that MS-FP, version 3.0, is less preferred. Desirably, the client selects DAV as the protocol to use for communication. However, if the client does not support DAV, then it should select MS-FP version 3.0, since it knows that the server supports this protocol, albeit on a less preferred basis than DAV.

Generating the List of Protocols

In this section of the detailed description, the manner by which the list of protocols is generated by the server in accordance with an embodiment of the invention is described. Those of ordinary skill within the art can appreciate, however, that the manner by which the ordered list of protocols is generated is not limited to the approaches described in this section, and that other approaches can be utilized as well.

In one embodiment, the server maintains a list of protocols that it supports, in order of preference, at a predetermined location at the server, for example, within a metabase. The list of protocols may be specified as, for instance, STRING MS-Author-Via "MS-FP/4.0, DAV" This stores the list of protocols as a string, identified by the header MS-Author-Via—that is, by the same header used in the response to the client that includes the list of protocols. In this embodiment, when a new protocol is supported by the server, it is added to this list by modifying the string.

In another embodiment, which is less robust than the embodiment of the previous paragraph, a Boolean value is used to determine the list returned. For example, the Boolean value may specify whether or not a given first protocol is supported by the server, in the case where if it is supported, then it is always preferred, and in the case where a given second protocol is always assumed to be supported by the server. An example pseudo-code of such an embodiment is IF TRUE RETURN "MSFP/4.0, DAV" ELSE RETURN "DAV" Thus, if the Boolean value is true, then this means that MSFP/4.0 is supported, and that it is preferred to DAV, which is assumed to always be supported, such that the list is "MSFP/4.0, DAV". Otherwise, if the Boolean value is false, then only "DAV" is returned.

Methods

In this section of the detailed description, methods according to varying embodiments of the invention are described. The description is made with reference to FIG. 2, which is a flowchart of a computer-implemented method according to one embodiment of the invention. The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The method of FIG. 2 is divided into two sections, a first section 200 indicating the parts of the method of FIG. 2 that are performed by a client, and a second section 202 indicating the parts that are performed by a server. The two sections as shown in FIG. 2 are separated by a dotted line for added clarity.

In 400, the client transmits a request according to a transport protocol to obtain a list of server-supported protocols in order of server preference. In one embodiment, the request is an OPTIONS request according to HTTP. In 402, the server receives this request, and in response, in 404 generates the list of server-supported protocols in order of preference and in 406 transmits this list back to the client, according to a transport protocol such as HTTP, as has been described. The client receives the list in 408, and based on the list, selects a protocol to use for client-server communication in 410. After this, client-server-communication desirably occurs in accordance with the selected protocol in 412.

System

In this section of the detailed description, a description of a system according to an embodiment of the invention is provided. The description is made with reference to FIG. 3. Referring now to FIG. 3, the system thereof includes a client 300 and a server 302. Each of the client 300 and the server 302 can include a computer-readable medium, and a processor coupled thereto, and can be implemented as described already in conjunction with FIG. 1. The client 300 is communicatively coupled-to the server 302 via a network 304, such as the Internet, an intranet, or an extranet.

The client 300 sends a request 306 according to a predetermined transport protocol such as HTTP. The request 306 is to determine a list of server-supported protocols in order of server preference. In response to receipt of the request 306, the server 302 generates and sends a response 308 according to a predetermined transport protocol such as HTTP. The response 308 includes the list of server-supported protocols, in order of server preference, as has been described.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A computer-implemented method for a server for providing to a client a list of client-server protocols supported by the server, comprising:

receiving from the client a request according to a predetermined transport protocol and directed to a resource located at the server;

generating a list of supported client-server protocols by the server, wherein the list is specific to the resource specified in the request and is ordered by server preference; and transmitting the a list of supported client-server protocols to the client according to the predetermined transport protocol.

2. The method of claim 1, wherein the predetermined transport protocol comprises HyperText Transport Protocol (HTTP).

3. The method of claim 2, wherein the request comprises an OPTIONS request under HTTP.

4. The method of claim 2, wherein the request comprises a form including a first line "OPTIONS/<dir>HTTP/<version>," where <dir> denotes a directory and <version> denotes an HTTP version, and a second line "HOST:<resource>," where <resource> denotes a resource.

5. The method of claim 4, wherein the form further includes a third line "CONTENT-LENGTH:<length>," where <length> denotes content length.

6. The method of claim 2, wherein the list comprises a form "<header>:<space>" followed by at least one specified protocols and their versions having a form "<string>/<version>," where <header> denotes a header, <space> denotes a space, <string> denotes a string, and <version> denotes a version having a form "<num>.<num>," where <num> denotes a number.

7. The method of claim 6, wherein the <header> comprises "MS-AUTHOR-VIA".

8. The method of claim 1, wherein the list comprises up to a predetermined number of supported client-server protocols by the server selected from a complete list of supported client-server protocols in order of server preference.

9. A machine-readable medium having instructions stored thereon for execution by a processor of a server to perform a method for providing to a client a list of client-server protocols supported by the server, comprising:

receiving a request according to a predetermined transport protocol and directed to a resource located at the server;

providing a list of supported client-server protocols by the server, wherein the list is specific to the resource specified in the request and is ordered by server preference; and transmitting the list of supported client-server protocols to the client according to the predetermined transport protocol, wherein the list comprises a form "<header>:<space>" followed by at least one specified protocols and their versions having a form "<strong>/<version>," where <header> denotes a header, <space> denotes a space, <string> denotes a string, and <version> denotes a version having a form "<num>.<num>," where <num> denotes a number.

10. The medium of claim 9, wherein the predetermined transport protocol comprises HyperText Transport Protocol (HTTP).

11. The medium of claim 10, wherein the request comprises an OPTIONS request under HTTP, having a form including a first line "OPTIONS/<dir>HTTP/<version>," where <dir> denotes a directory and <version> denotes an HTTP version, a second line "HOST:<resource>," where <resource> denotes a resource, and a third line "CONTENT-LENGTH:<length>," where <length> denotes content length.

12. The medium of claim 9, wherein the <header> comprises "MS-AUTHOR-VIA".

13. The medium of claim 9, wherein the list comprises up to a predetermined number of supported client-server protocols by the server selected from a complete list of supported client-server protocols in order of server preference.

14. A computer-implemented method for a client for obtaining a list of client-server protocols supported by a server, comprising:

transmitting a request according to a predetermined transport protocol and directed to a resource located at the server;

receiving from the server a list of supported client-server protocols by the server, wherein the list is specific to the resource specified in the request, is ordered by server preference, and is transmitted by the server to the client according to the predetermined transport protocol; and selecting by the client one of the supported client-server protocols specified in the list received from the server for use by the client in future requests directed to the resource made by the client to the server.

15. The method of claim 14, wherein the predetermined transport protocol comprises HyperText Transport Protocol (HTTP).

16. The method of claim 15, wherein the request comprises an OPTIONS request under HTTP.

17. The method of claim 15, wherein the request comprises a form including a first line "OPTIONS/<dir>HTTP/<version>," where <dir> denotes a directory and <version> denotes an HTTP version, and a second line "HOST:<resource>," where <resource> denotes a resource.

18. The method of claim 17, wherein the form further includes a third line "CONTENT-LENGTH:<length>," where <length> denotes content length.

19. The method of claim 15, wherein the list comprises a form "<header>:<space>" followed by at least one specified protocols and their versions having a form "<string>/<version>," where <header> denotes a header, <space> denotes a space, <string> denotes a string, and <version> denotes a version having a form "<num>.<num>," where <num> denotes a number.

20. The method of claim 19, wherein the <header> comprises "MS-AUTHOR-VIA".

21. The method of claim 14, wherein the list comprises up to a predetermined number of supported client-server protocols by the server selected from a complete list of supported client-server protocols in order of server preference.

22. A machine-readable medium having instructions stored thereon for execution by a processor of a client to perform a method for obtaining a list of client-server protocols supported by a server, comprising:

transmitting a request according to a predetermined transport protocol and directed to a resource located at the server; and receiving from the server a list of supported client-server protocols by the server, wherein the list is specific to the resource specified in the request, is ordered by server preference, and is transmitted by the server according to the predetermined transport protocol, and wherein the list comprises a form "<header>:<space>" followed by at least one specified protocols and their versions having a form "<string>/<version>," where <header> denotes a header, <space> denotes a space, <string> denotes a string, and <version> denotes a version having a form "<num>.<num>," where <num> denotes a number.

23. The medium of claim 22, wherein the predetermined transport protocol comprises HyperText Transport Protocol (HTTP).

24. The medium of claim 23, wherein the request comprises an OPTIONS request under HTTP, having a form including a first line "OPTIONS/<dir>HTTP/<version>," where <dir> denotes a directory and <version> denotes an HTTP version, a second line "HOST:<resource>," where <resource> denotes a resource, and a third line "CONTENT-LENGTH:<length>," where <length> denotes content length.

25. The medium of claim 22, wherein the <header> comprises "MS-AUTHOR-VIA".

26. The medium of claim 22, wherein the list comprises up to a predetermined number of supported client-server protocols by the server selected from a complete list of supported client-server protocols in order of server preference.

27. A computerized system for providing a list of client-server protocols supported by a server, comprising:
   a client having computer executable instructions for transmitting to the server a request according to a predetermined transport protocol and directed to a resource located at the server; and
   a server having computer executable instructions for receiving the request from the client,
   generating a list of supported client-server protocols by the server, wherein the list is specific to the resource specified in the request and is ordered by server preference; and
   transmitting the list of supported client-server protocols to the client according to the predetermined transport protocol.

28. The method of claim 27, wherein the request comprises an OPTIONS request under HTTP.

29. The system of claim 28, wherein the request comprises an OPTIONS request under HTTP, having a form including a first line "OPTIONS/<dir>HTTP/<version>," where <dir> denotes a directory and <version> denotes an HTTP version, a second line "HOST:<resource>," where <resource> denotes a resource, and a third line "CONTENT-LENGTH:<length>," where <length> denotes content length.

30. The system of claim 28, wherein the list comprises a form "<header>:<space>" followed by at least one specified protocols and their versions having a form "<string>/<version>," where <header> denotes a header, <space> denotes a space, <string> denotes a string, and <version> denotes a version having a form "<num>.<num>," where <num> denotes a number.

31. The medium of claim 30, wherein the <header> comprises "MS-AUTHOR-VIA".

32. The medium of claim 27, wherein the list comprises up to a predetermined number of supported client-server protocols by the server selected from a complete list of supported client-server protocols in order of server preference.

* * * * *

UNITED STATES PATENT AND TRADEMARK OFFICE
CERTIFICATE OF CORRECTION

PATENT NO. : 6,658,476 B1
DATED : December 2, 2003
INVENTOR(S) : Van C. Van

It is certified that error appears in the above-identified patent and that said Letters Patent is hereby corrected as shown below:

Column 1,
Line 61, after "<resource>." please delete "<resour.extension>," and insert
-- <resource.extension>, --

Column 2,
Line 14, after "pages 3-8," please delete "WEBDav" and insert -- WebDAV --

Column 5,
Line 54, after "which" please delete "an" and insert -- a --

Column 6,
Lines 61-62, after "it does not" please delete "indicated" and insert -- indicate --

Column 7,
Line 3, after "that it is" please delete "desirably" and insert -- desirable --

Column 9,
Line 37, after "at least one" please insert -- of the --

Column 10,
Line 22 and 47, after "at least one" please insert -- of the --

Column 12,
Line 8, after "at least one" please insert -- of the --

Signed and Sealed this

Twenty-eighth Day of September, 2004

JON W. DUDAS
*Director of the United States Patent and Trademark Office*